Oct. 5, 1954 D. A. JENNY 2,691,115
CELLULAR TARGET FOR CATHODE-RAY TUBES
Filed Feb. 7, 1951 2 Sheets-Sheet 1

INVENTOR
Dietrich A. Jenny
BY
William A. Zalesak
ATTORNEY

Oct. 5, 1954 D. A. JENNY 2,691,115
CELLULAR TARGET FOR CATHODE-RAY TUBES
Filed Feb. 7, 1951 2 Sheets-Sheet 2
*Fig. 3*
*Fig. 4*
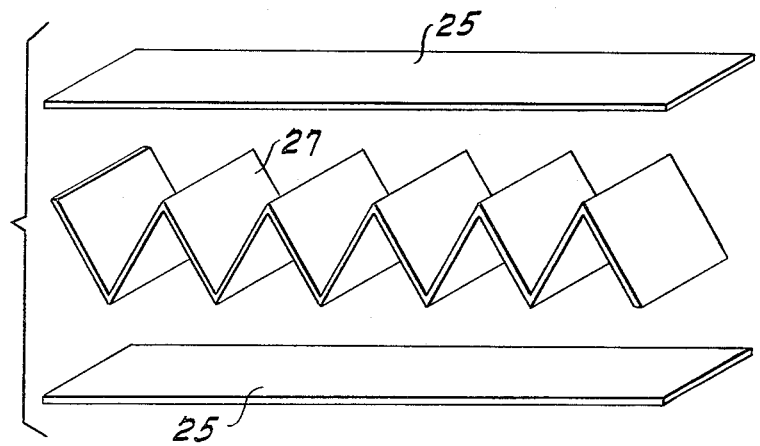
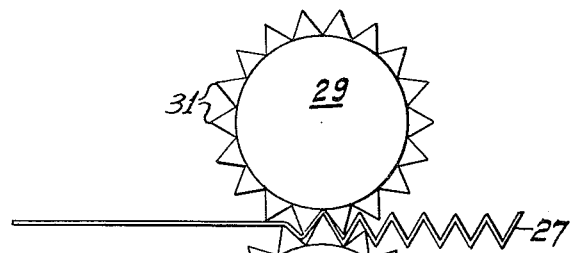
*Fig. 5*
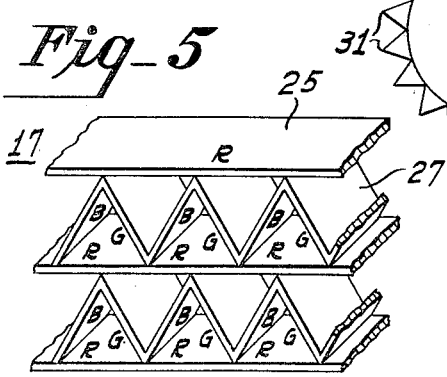
INVENTOR
Dietrich A. Jenny
BY
William A. Zalesak
ATTORNEY Patented Oct. 5, 1954

2,691,115

UNITED STATES PATENT OFFICE 2,691,115

CELLULAR TARGET FOR CATHODE-RAY TUBES

Dietrich A. Jenny, Princeton, N. J., assignor to Radio Corporation of America, a corporation of Delaware Application February 7, 1951, Serial No. 209,800

3 Claims. (Cl. 313—70)

This invention relates to improvements in color-kinescopes of the type (i e. "directional" type) wherein the color-phosphor that is illuminated at any given instant is determined by the direction in which the electrons approach a target of the "cellular" variety.

The cellular targets heretofore used in some color-kinescopes comprise a sheet-metal structure in the form of a "honeycomb" made up of a multiplicity of rows of hexagonal cells. When, as is usually the case, a three-color image is required, two adjacent inner faces of each cell are allotted to each of the three primary colors. Either a single electron-gun or a battery of three guns may be used in activating the different color phosphors of a honeycomb screen. If three guns are employed, they are disposed in equally spaced relation about the longitudinal axis of the tube so that each beam "sees" but two of the six phosphor covered inner faces of each cell. When the tube contains but a single electron gun, its beam is deviated and rotated to the equivalent of the points of origin of the three gun beams, so that it too approaches the honeycomb at angles individual to the pairs of cell faces which are allotted to the different color phosphors. The prior art as to cellular targets of the honeycomb variety is exemplified in co-pending applications of Schroeder, Serial No. 140,786 filed January 27, 1950, now U. S. Patent 2,579,705, issued December 25, 1951 and Green, Serial No. 159,071 filed April 29, 1950, now U. S. Patent 2,579,665, issued December 25, 1951.

The difficulties encountered in the manufacture of a "honeycomb" screen arise from the fact that the individual cells must ordinarily be of "sub-elemental image dimensions," as that term is understood in the television art. The formula is:

$$d = \frac{h}{n}$$

where $d$ is the effective diameter of each cell, $h$ is the height or vertical dimension of the screen and $n$ is the total number of horizontal lines in the scanning raster. In a 525 line system with a 12" screen, $h=12$, $n=525$, and the diameter of each cell $$= \frac{12}{525} \text{ or } .02''$$

Since the hexagons are equilateral, in a square screen there will be as many vertical rows as horizontal rows; and in a 525 line system $525^2$, or 275,625, separate hexagonal cells, with each cell only .02" in diameter. If color dilution is to be avoided, each of these cells must be substantially perfectly symmetrical in construction, and each row of cells must be perfectly alinged or "nested" with the hexagonal cells of the next contiguous row.

Accordingly, the principal object of the present invention is to provide a cellular target of a relatively simple, non-critical construction which shall lend itself readily to mass production methods, and one nevertheless characterized in operation by its relative freedom from color-dilution.

The foregoing and related objects are achieved in accordance with the invention by the provision of a directional type cellulor screen constituted of alternate layers of flat and multiangle strips stacked one upon the other, in sandwich fashion, to form a cellular structure wherein the individual cells are triangular (instead of hexagonal) in cross-section. Unlike the cellular screens of the prior art, the cells in each row need not be "nested" or brought into register with the cells in the other rows, but may be stacked without regard to their alignment.

The invention is described in greater detail in connection with the accompanying two sheets of drawings, wherein:

Fig. 3 shows in perspective the flat and angular strips which go into the fabrication of a screen according to the invention;

Fig. 4 shows the triangular toothed gear wheels used to fabricate the angular strips used in fabricating the screen; and Fig. 5 is a view in perspective of an alternative form of phosphor screen constructed in accordance with the invention.

A screen electrode constructed in accordance with the invention may be used in a cathode-ray tube employing either a single electron-gun with a rotating electron beam (as described in copending U. S. application 165,552 of Russell R. Law, filed June 1, 1950), or three-guns (as described in U. S. Patent 2,481,839 to Alfred N. Goldsmith). The three-gun tube has here been selected for illustration.

Figure 1:
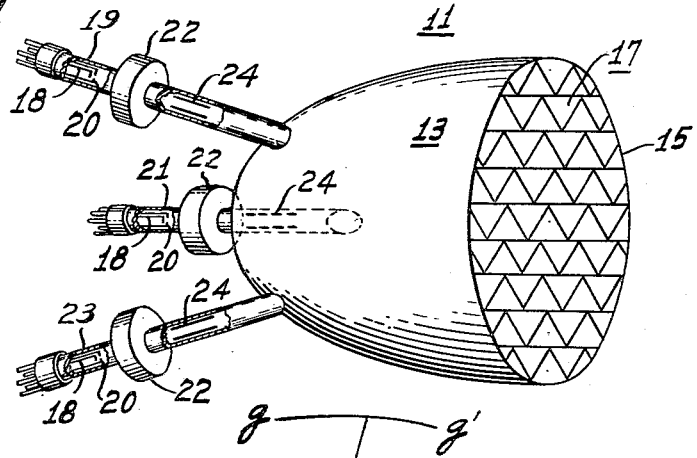
Fig. 1 is a view in perspective of a three-gun kinescope containing a directional, cellular type screen embodying the invention.

The tube shown in Fig. 1 comprises an evacuated envelope 11 having a bulbous portion or main chamber 13 which terminates in a translucent face plate or window 15. The directional screen or target electrode 17 of the present invention, is disposed within the main chamber 13 closely adjacent to the window 15. The inner surface of the face 15 is preferably frosted to diffuse the colored lights which emanate, in a manner later described, from the screen 17.

Disposed at 120° intervals about the longitudinal axis of the tube are three necks 19, 21, 23. These necks contain vacuous spaces continuous with the vacuum in the main chamber 13, and they are arranged with individual longitudinal axes converging upon the screen 17. Each neck will be understood to contain an electron-source or gun comprising an electron emitter 18 and a control electrode 20 with a focusing coil 22 and beam deflecting elements 24.

The screen 17 is connected to a positive source of potential (not shown) with respect to the electron guns so that it serves as the target electrode for the three electron beams from said guns. Due to the position of the guns, 120° apart around the longitudinal axis of the tube, the beam from each gun approaches the target or inner side of the cellular screen structure from a different angle and impinges only upon those surfaces of the screen which are directly opposed to it. Thus, each of the three beams is allotted to a different one-third of the total number of separate surfaces in the honeycomb structure. Stated another way, different sides of each triangle lie in the path of different ones of the three electron-beams. Thus, if the gun in the neck 19, for example, is modulated by red color signals, the gun in neck 21 by blue signals, and the gun in neck 23 by green signals, each triangle will emit red, green, or blue light, as determined by the particular beam which enters that cell at any given instant.

If a single gun is used, following the method described in the Law application referred to above, additional attention must be given to the problem of color dilution. The problem will be discussed from the point of the color blue, but it is equally applicable to the other colors. It arises in this way.

Along any horizontal line of contiguous triangles the apex of one follows the base of its neighbor. This is shown along the line A A' in Fig. 2. As a consequence, if the color blue is obtained by electrons striking triangle X on its side and triangle Y on its base, electrons travelling a straight line from the single point source P will successfully avoid the red surface R' and the green surface G'. But electrons from the full 120° arc extending 60° either side of the source P will strike these red and green surfaces as well as the blue, and color dilution will result. This would be the situation if the full 360° of a rotating beam were utilized in three separate 120° segments. In order to avoid the difficulty the beam is rendered inoperative except for the short time that it traverses the arcs r r', g g' and b b' of Fig. 2. This may be accomplished by either electronically blocking the beam or mechanically masking it except while it traverses the desired arc. Such blocking and masking means are shown and described in the copending application of Russell R. Law, referred to above.

If a single rotating beam is used as described above, the full cycle of the beam may be utilized instead of limited portions by employing the screen structure shown in Fig. 5. This complete utilization of the beam is desirable when it is necessary to get more light from the tube. The technique shown is somewhat similar to that suggested by Fig. 4 of the Goldsmith patent referred to above in that only alternate triangles are used with half of the total screen surface being insensitive to the electron beam. Referring to Fig. 5, it will be noted that only the inner surfaces of alternate triangles are coated with phosphor and that there is a full 120° arc from which electrons may bombard a given color surface in all of the triangles without impinging upon the other two color surfaces.

Figure 2:
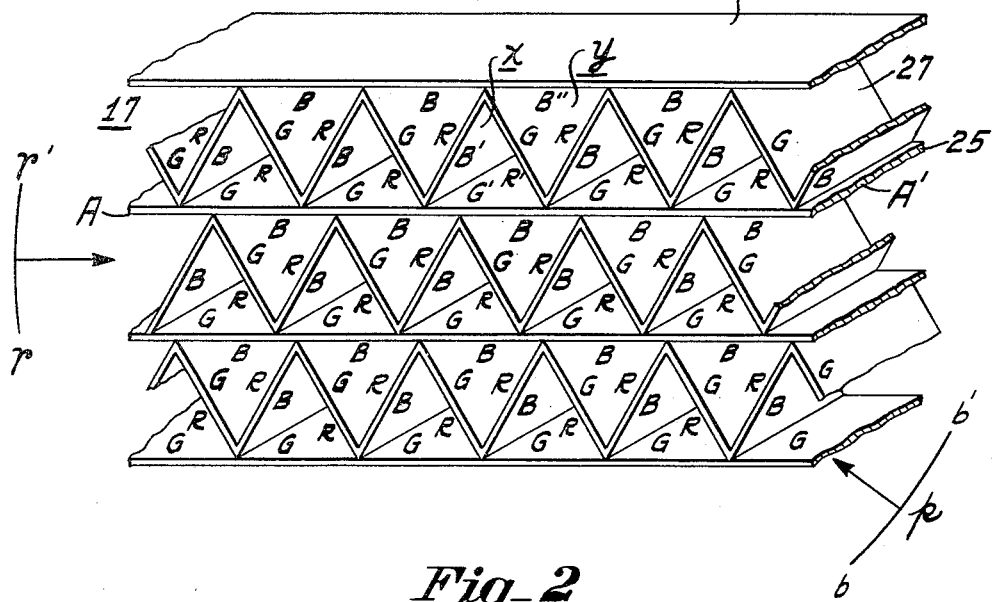
Fig. 2 is a view in perspective of a portion of the screen of Fig. 1 showing the arrangement of the different color phosphors and the angles of approach of the electron beams.

The directional screen 17 shown in Fig. 2 and Fig. 5 is constructed, in accordance with the present invention, by placing flat strips 25 and angularly corrugated strips 27 of thin metal material one upon the other until the desired dimensions are attained. (See Fig. 3.) The result is a cellular structure of individual contiguous triangular prisms. The depth of the prisms is determined by the width of the strips of which they are fabricated and should be approximately the equivalent of their altitude.

The angularly corrugated members 27 are prepared, as shown in Fig. 4, by rolling thin metal strips between gear wheels 29 with teeth 31 of triangular cross section. The size of the teeth is determined by the size of the individual triangles desired in the screen structure. Each tooth is a 60° triangle so that all sides of the hollow triangular prisms in the final structure are equal. Any suitable metal (e. g. copper or nickel) may be used for the strips 25 and 27.

The structure can be soldered together by plating the strips before assembly with a metal (e. g. silver) of a lower melting point than the strip metal; then placing the strips in a suitable jig or frame (not shown), and heating the entire assembly in a non-oxidizing atmosphere.

The color phosphors may be applied either before or after assembly. The teaching of Leverenz U. S. Patent 2,310,863 may be followed for the chemical composition of the different color producing phosphors. In this case, chromium activated aluminum berylliate or zinc cadmium sulphide activated by silver is used for red, silver activated zinc sulphide for blue, and manganese activated alpha willemite for green.

The screen has been described as being phosphor coated and used for a target electrode. It may also be used without the phosphor coating as a masking electrode.

As has been explained, a screen electrode built in accordance with this invention can be assembled without any need to consider the position of the triangles with reference to each other and, consequently, without the alignment problem encountered in the manufacture of hexagonal and other cellular screens of the prior art.

What is claimed is:

1. A screen electrode for a color-kinescope comprising a plurality of rows of hollow triangular prisms said rows being disposed one above the other, and wherein the hollow triangular prisms which comprise said rows have each of their sides coated with a different color-producing phosphor material.

2. A multi-color kinescope comprising an evacuated envelope containing the combination of a screen electrode constituted of a cellular structure of hollow triangular prisms, each of said prisms having each one of its three sides coated with a different color producing phosphor material, and means for selectively bombarding each of said phosphor coated sides of said prisms with cathode-ray beams approaching said screen electrode from different angles.

3. An electron discharge device comprising an evacuated envelope containing: three electron guns disposed on axes 120° from each other and about the longitudinal axis of said discharge device, a main chamber portion housing a phosphor-target electrode and a translucent face portion through which luminescence of said phosphor-target is visible, said target electrode comprising a plurality of hollow triangular prisms, said prisms having corresponding sides disposed each in a position to be bombarded by electrons from a particular one of said guns.

References Cited in the file of this patent

UNITED STATES PATENTS

| Number | Name | Date |
| --- | --- | --- |
| 1,724,298 | Miller | Aug. 13, 1929 |
| 1,890,339 | Romhild | Dec. 6, 1932 |
| 2,119,913 | Holstet et al. | June 7, 1938 |
| 2,122,750 | Nicolson | July 5, 1938 |
| 2,518,200 | Sziklai | Aug. 8, 1950 |
| 2,579,665 | Green | Dec. 25, 1951 |
| 2,579,705 | Schroeder | Dec. 25, 1951 |